United States Patent

Fujimori

(10) Patent No.: US 9,697,062 B2
(45) Date of Patent: Jul. 4, 2017

(54) INFORMATION PROCESSING DEVICE AND METHOD FOR MONITORING A BOOT-UP STATE OF OPERATING SYSTEM

(71) Applicant: FUJITSU LIMITED, Kawasaki-shi, Kanagawa (JP)

(72) Inventor: Takafumi Fujimori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 14/547,283

(22) Filed: Nov. 19, 2014

(65) Prior Publication Data
US 2015/0178175 A1   Jun. 25, 2015

(30) Foreign Application Priority Data

Dec. 25, 2013   (JP) ................................. 2013-266690

(51) Int. Cl.
G06F 9/44 (2006.01)
G06F 11/07 (2006.01)

(52) U.S. Cl.
CPC ...... G06F 11/0706 (2013.01); G06F 11/0757 (2013.01)

(58) Field of Classification Search
CPC ........ G06F 9/24; G06F 9/4406; G06F 9/4411; G06F 11/0706
See application file for complete search history.

(56) References Cited

U.S. PATENT DOCUMENTS

| | | | | |
|---|---|---|---|---|
| 8,037,364 | B2* | 10/2011 | Kern | G06F 11/2028 714/11 |
| 2004/0073637 | A1* | 4/2004 | Larson | H04L 12/4641 709/222 |
| 2005/0091449 | A1* | 4/2005 | Cherian | G06F 3/0607 711/114 |
| 2009/0210601 | A1* | 8/2009 | Greenstein | H04L 69/32 710/305 |
| 2011/0145634 | A1 | 6/2011 | Tabuchi | |
| 2013/0151841 | A1* | 6/2013 | McGraw | G06F 11/3006 713/100 |
| 2015/0149815 | A1* | 5/2015 | Maity | G06F 11/1435 714/5.11 |
| 2015/0169221 | A1* | 6/2015 | Shirasu | G06F 3/0685 711/163 |

FOREIGN PATENT DOCUMENTS

JP   2011-128795   6/2011

* cited by examiner

*Primary Examiner* — Chun Cao
(74) *Attorney, Agent, or Firm* — Fujitsu Patent Center

(57) ABSTRACT

An information processing device includes a processing unit, a control unit, and a monitoring unit. The processing unit executes an OS. The control unit controls an I/O device connected to the processing unit, and obtains, from the processing unit, management information about the I/O device. The monitoring unit monitors a boot-up state of the OS based on the management information obtained by the control unit.

6 Claims, 9 Drawing Sheets

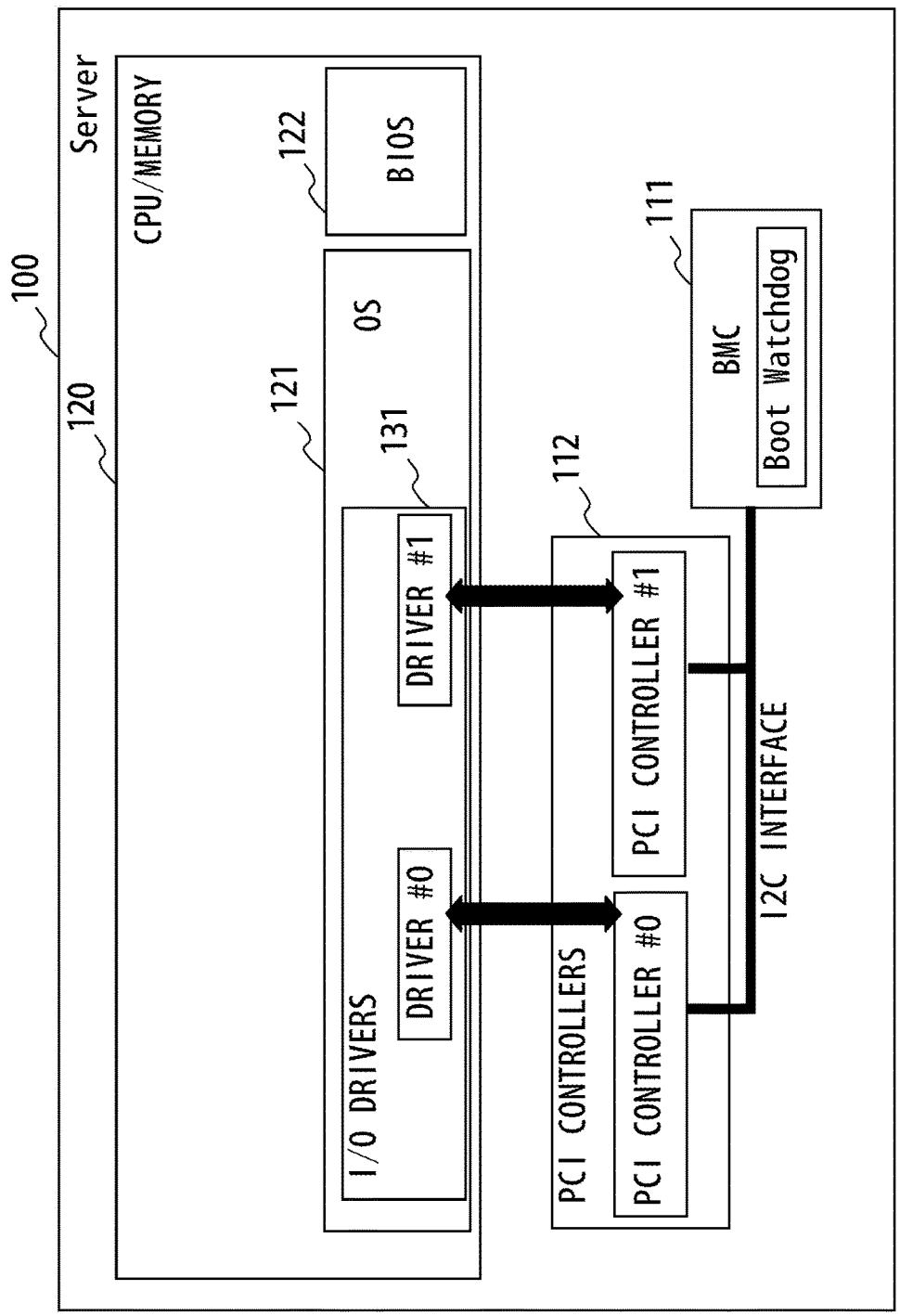
F I G. 1

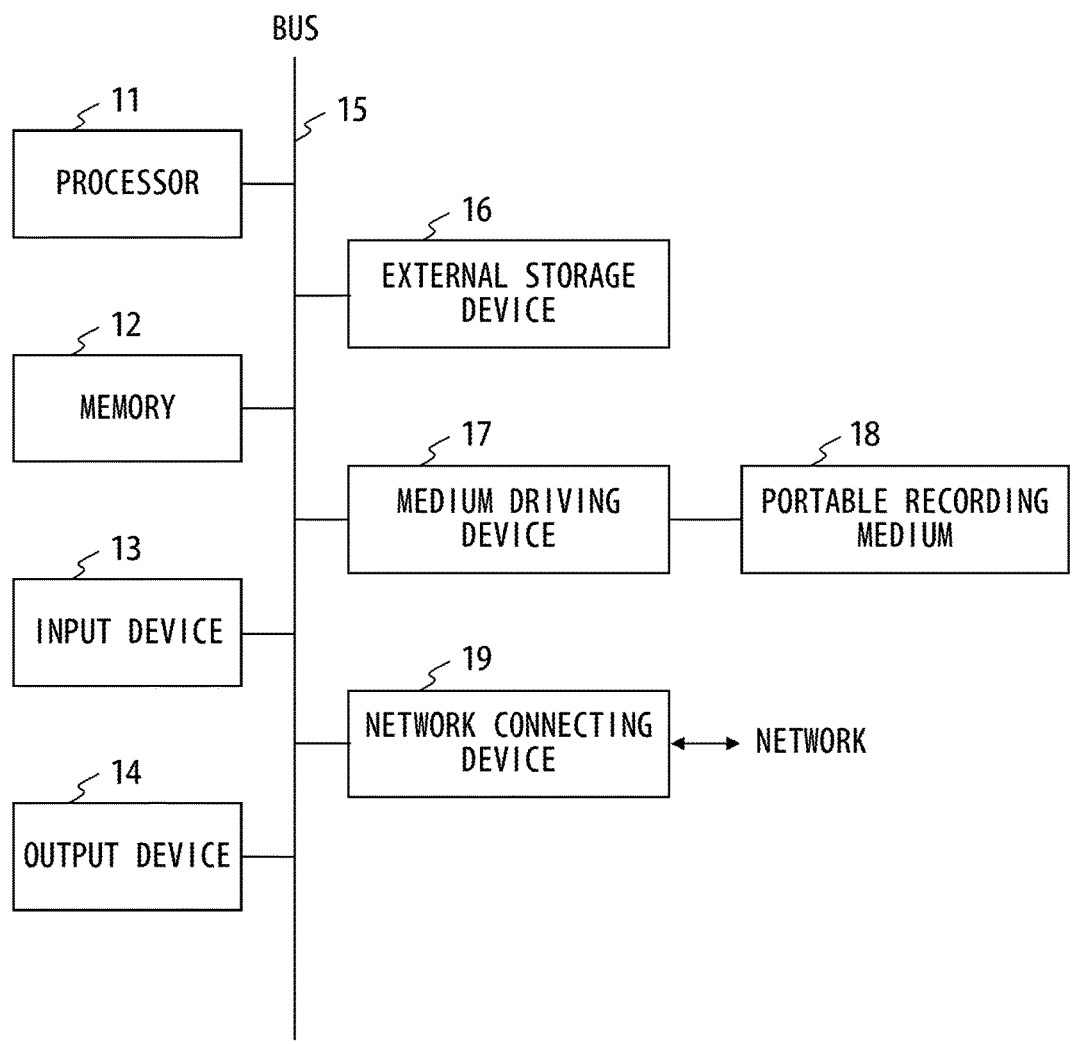
F I G. 2

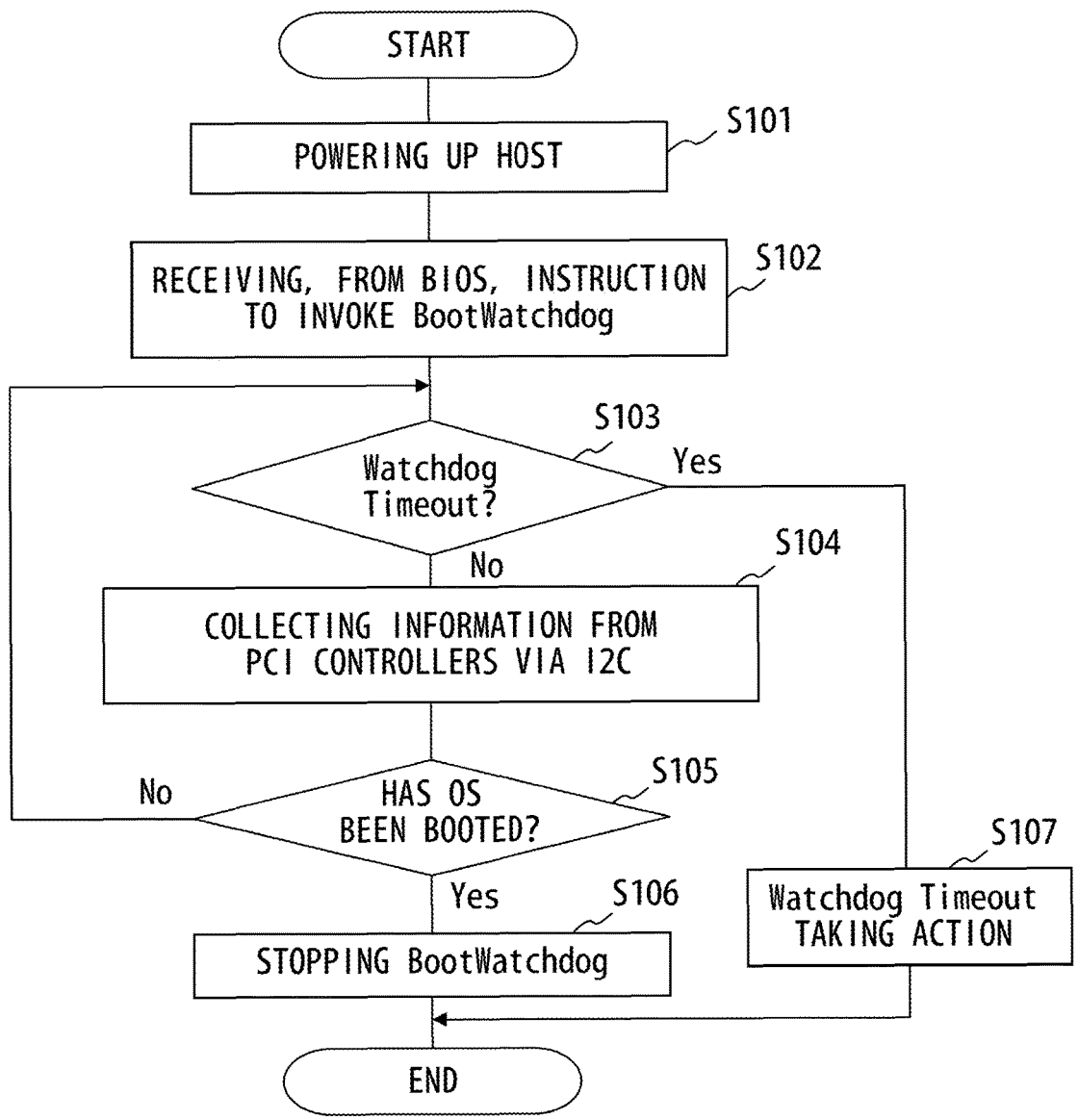
F I G. 6

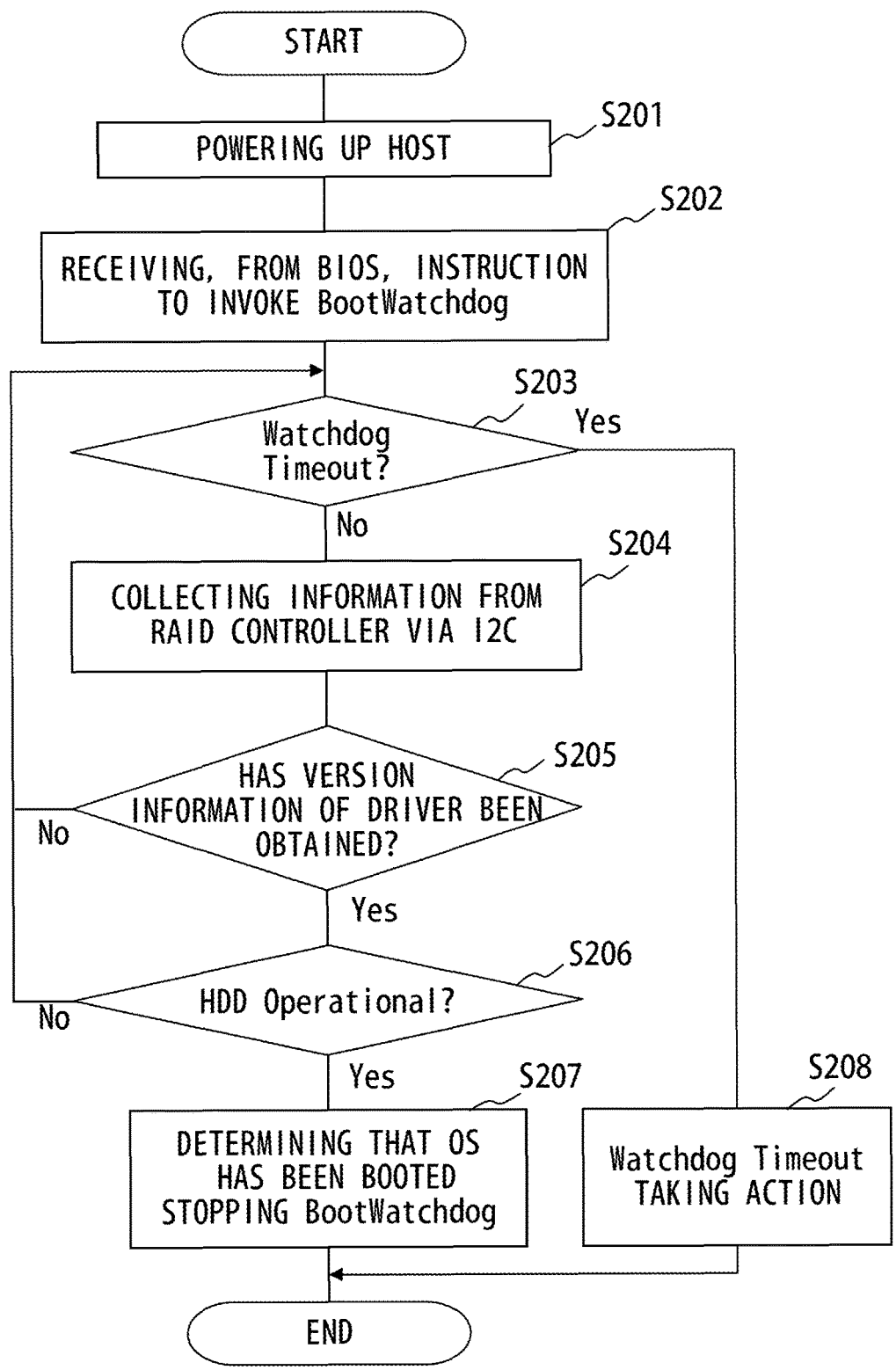
F I G. 7

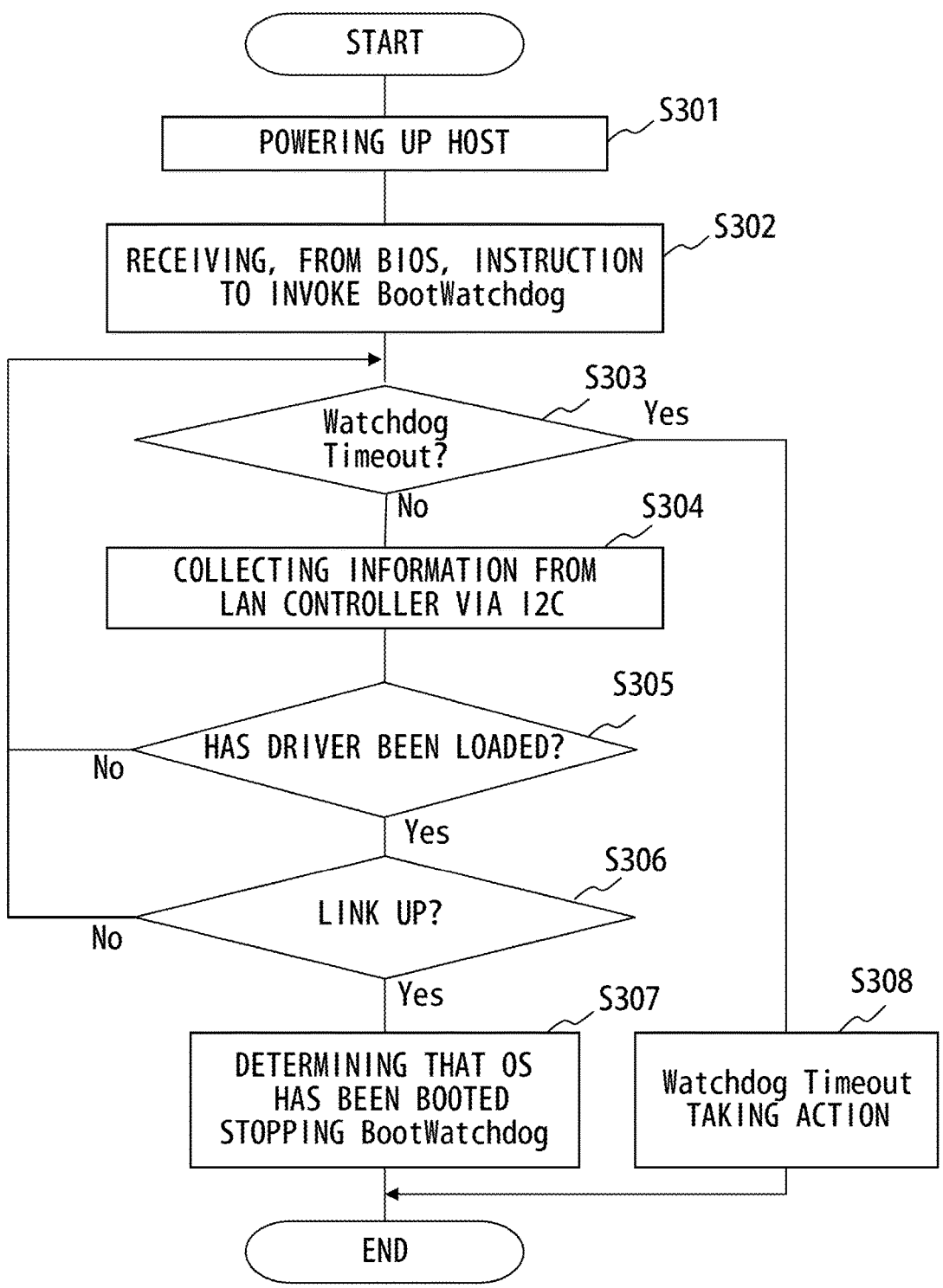
F I G. 8

INFORMATION PROCESSING DEVICE AND METHOD FOR MONITORING A BOOT-UP STATE OF OPERATING SYSTEM

CROSS-REFERENCE TO RELATED APPLICATION

This application is based upon and claims the benefit of priority of the prior Japanese Patent Application No. 2013-266690, filed on Dec. 25, 2013, the entire contents of which are incorporated herein by reference.

FIELD

The embodiments discussed herein are related to monitoring of an OS (Operating System).

BACKGROUND

A server device is equipped with firmware that manages and monitors mounted hardware. Firmware is, for example, a BMC (Baseboard Management Controller). Moreover, the server device is equipped with an agent that manages and monitors installed software. The agent is software that operates after an OS is booted.

At boot-up of the OS, the BMC and the agent execute a process of monitoring the OS in cooperation with each other. When the server device is powered up, it starts to boot the OS. The BMC starts a BootWatchdog process along with the boot-up process of the OS. The BootWatchdog is a function of monitoring the boot-up of an OS and preventing the boot-up of the OS from being hung up. The BootWatchdog executes a process such as a rebooting or a stopping of the server device, for example, when the boot-up of the OS is not complete even though a specified amount of time has elapsed after the BootWatchdog was invoked. Upon completion of the boot-up of the OS, the agent issues, to the BMC, an instruction to stop the function of the BootWatchdog. The agent is invoked while the OS is being booted. Accordingly, the agent determines whether the OS has been booted by judging whether the local agent was invoked. When the OS is not booted, this directly affects operations of a user. Therefore, it is important to monitor the boot-up of the OS of the server device.

As a technique related to monitoring of an OS, a technique with which a BMC monitors a closed state of a PCI (Peripheral Component Interconnect) bus and executes a recovery process of the PCI bus not via the OS when a fault occurs is known (for example, see patent Document 1).

Patent Document 1: Japanese Laid-open Patent Publication No. 2011-128795

SUMMARY

According to an aspect of the embodiments, an information processing device includes a processing unit, a control unit, and a monitoring unit. The processing unit executes an OS. The control unit controls an I/O device connected to the processing unit, and obtains, from the processing unit, management information about the I/O device. The monitoring unit monitors a boot-up state of the OS based on the management information obtained by the control unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of a process of monitoring the boot-up of an OS of a server device according to a first embodiment;

FIG. 2 illustrates an example of a hardware configuration of the server device;

FIG. 6 is a flowchart for explaining the process of monitoring the boot-up of the OS of the server device according to the first embodiment;

FIG. 7 is a flowchart for explaining the process of monitoring the boot-up of the OS of the server device according to the second embodiment;

FIG. 8 is a flowchart for explaining the process of monitoring the boot-up of the OS of the server device according to the third embodiment.

DESCRIPTION OF EMBODIMENTS

Figure 3:
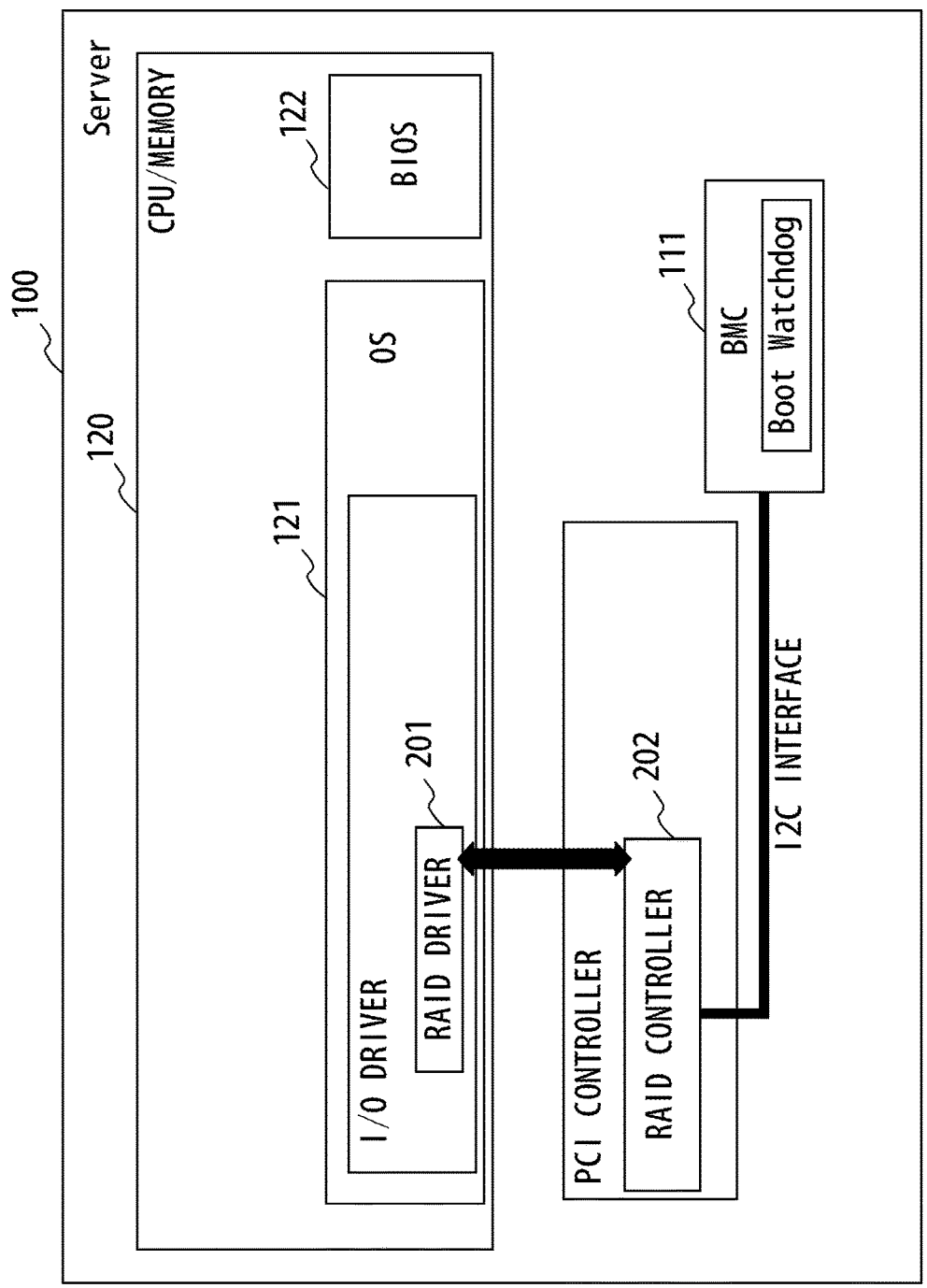
FIG. 3 is an explanatory diagram of a process of monitoring the boot-up of an OS of a server device according to a second embodiment.

The above described prior technique has the following problem.

OSes supportable by an agent that determines whether an OS has been booted are limited. Therefore, to monitor the boot-up of an OS with the above described method, an agent that corresponds to the OS is preinstalled in a server device. Namely, the above described method has room for improvements in convenience. In one aspect, an object of the present invention is to monitor the boot-up of an OS without using software corresponding to the OS to be monitored.

An embodiment is described in detail below with reference to the drawings.

FIG. 1 is an explanatory diagram of a process of monitoring the boot-up of an OS of a server device according to a first embodiment. A motherboard mounted in the server device 100 includes a BMC 111, PCI controllers 112, and a CPU/memory 120. The memory 120 stores an OS 121, a BIOS 122, and the like. The CPU is a processing unit that executes the OS 121, the BIOS 122, and the like. In the OS 121, I/O drivers 131 are installed. The I/O drivers 131 execute a process of causing the OS 121 to recognize various types of devices mounted, for example, in the server device 100. Moreover, the I/O drivers 131 control inputs and outputs of I/O devices connected to the I/O drivers 131. The I/O drivers 131 have management information of the various types of devices mounted in the server device 100. When the server device 100 is powered up, the BIOS 122 completes initial setup and the like of the various types of devices mounted in the server device 100. The BMC 111 is firmware that manages and monitors the various types of devices mounted in the server device. The BMC 111 operates as a management unit or a monitoring unit. The PCI controllers 112 are connected to the I/O drivers 131, and control inputs and outputs of the various types of devices mounted in the server device 100. Moreover, the PCI controllers 112 obtain, from the I/O drivers 131, the management information of the various types of devices mounted in the server device 100. The PCI controllers 112 operate as a control unit. The PCI controllers 112 are connected to the I/O drivers 131, for example, by using a PCI interface. Moreover, the PCI controllers 112 are connected to the BMC 111, for example, by using an I2C interface.

An example of a sequence of the process of monitoring the boot-up of an OS of an information processing device (the server device) according to this embodiment is described below.

(1) When the server device is powered up, the BIOS 122 starts the process.

(2) Upon completion of a process such as initial setup of various types of devices mounted in the server device 100, the BIOS 122 notifies the BMC 111 of an instruction to invoke the BootWatchdog, and passes the process to the OS 121.

(3) The OS 121 starts to be booted.

(4) The BMC 111 determines whether a specified amount of time has elapsed after the BootWatchdog was invoked.

(5) The BMC 111 executes a process such as a rebooting or a stopping of the server device when the boot-up of the OS is not complete even though the specified amount of time has elapsed after the BootWatchdog was invoked.

(6) If the specified amount of time has not elapsed, the BMC 111 obtains, from the PCI controllers 112, the management information of the various types of devices mounted in the server device 100.

(7) The BMC 111 determines whether the OS 121 has been booted. When the I/O drivers 131 recognize the various types of devices, the BMC 111 determines that the OS 121 has been booted by using the management information of the various types of devices mounted in the server device 100.

(8) When the I/O drivers 131 do not recognize the various types of devices, the BMC 111 determines that the OS 121 has not been booted. When the BMC 111 determines that the OS 121 has not been booted, the process in and after (4) is repeated.

(9) When the BMC 111 determines that the OS 121 has been booted, it stops the BootWatchdog. Here, the process of monitoring the boot-up of the OS is ended.

When the server device is reactivated with the process in (5), it repeats the process in and after (1). When the server device is stopped with the process in (5), it ends the process.

By executing the process in (1) to (9), the server device is able to determine that an OS has been booted even in a system not equipped with an agent. I/O drivers recognize various types of devices, so that the server device verifies that the OS has been booted.

FIG. 2 illustrates an example of a hardware configuration of the server device. The server device includes a processor 11, a memory 12, a bus 15, an external storage device 16, and a network connecting device 19. The server device may also include an input device 13, an output device 14, and a medium driving device 17 as options. The server device is sometimes implemented, for example, with a computer or the like.

The processor 11 may be implemented as an arbitrary processing circuit including a central processing unit (CPU). The processor 11 operates as the I/O drivers 131, the PCI controllers 112, and the BMC 111. Moreover, the PCI controllers 112 and the BMC 111 may include a CPU within a chip, and may execute a process with the CPU within the chip. Note that the processor 11 is able to execute a program stored, for example, in the external storage device 16. The memory 12 operates as a storage unit. Moreover, the memory 12 stores data obtained with an operation of the processor 11, and data used for a process of the processor 11 when needed. The network connecting device 19 is used and operates for a communication with another device.

The input device 13 is implemented, for example, as a button, a keyboard, a mouse or the like. The output device 14 is implemented, for example, as a display or the like. The bus 15 interconnects the processor 11, the memory 12, the input device 13, the output device 14, the external storage device 16, the medium driving device 17, and the network connecting device 19 so that they are able to mutually exchange data. The external storage device 16 stores a program, data and the like, and provides stored information to the processor 11 or the like when needed. The medium driving device 17 is able to output data of the memory 12 and the external storage device 16 to a portable storage medium 18, and is able to read the program, the data and the like from the portable storage medium 18. Here, the portable storage medium 18 is implemented as an arbitrary portable storage medium (non-transitory computer-readable recording medium) including a floppy disk, a magneto-optical (MO) disk, a compact disk recordable (CD-R), and a digital versatile disk recordable (DVD-R). The computer-readable storage medium may store, for example, a monitoring program that causes the processor 11 to execute the process of monitoring the boot-up of the OS of the server device shown in FIGS. 6 to 9 as described below.

FIG. 3 is an explanatory diagram of a process of monitoring the boot-up of an OS of a server device according to a second embodiment. In FIG. 3, the same components as those of FIG. 1 are denoted with the same reference numerals. The server device 100 according to the second embodiment has a RAID (Redundant Array of Inexpensive Disks) driver 201, which is an I/O driver. The server device 100 also has a RAID controller 202, which is a PCI controller. The RAID driver 201 notifies the RAID controller 202 of the contents of an update when management information is updated while the OS is being booted. The process of monitoring the boot-up of the OS of the server device according to the second embodiment is the same as that in (1) to (9).

The BMC 111 obtains the management information from the RAID controller 202, and determines whether the OS 121 has been booted. The management information in the second embodiment is driver information, and status information of HDDs (Hard Disk Drives). The BMC 111 determines that the OS 121 has been booted when, in the management information, the driver information stores version information of a driver and the status information of HDDs stores information indicating that all HDDs are available. The RAID driver 201 notifies the RAID controller 202 of the version information of the driver while the OS is being booted. In the meantime, the RAID controller 202 clears the version information of the driver when the server device 100 is powered down. Firmware that manages the HDDs notifies the RAID controller 202 of the status information of the HDDs while the OS is being booted. In the meantime, the RAID controller 202 clears the status information of the HDDs when the server device 100 is powered down. Note that the management information is not limited to the version information and the status information of the HDDs.

Figure 4:
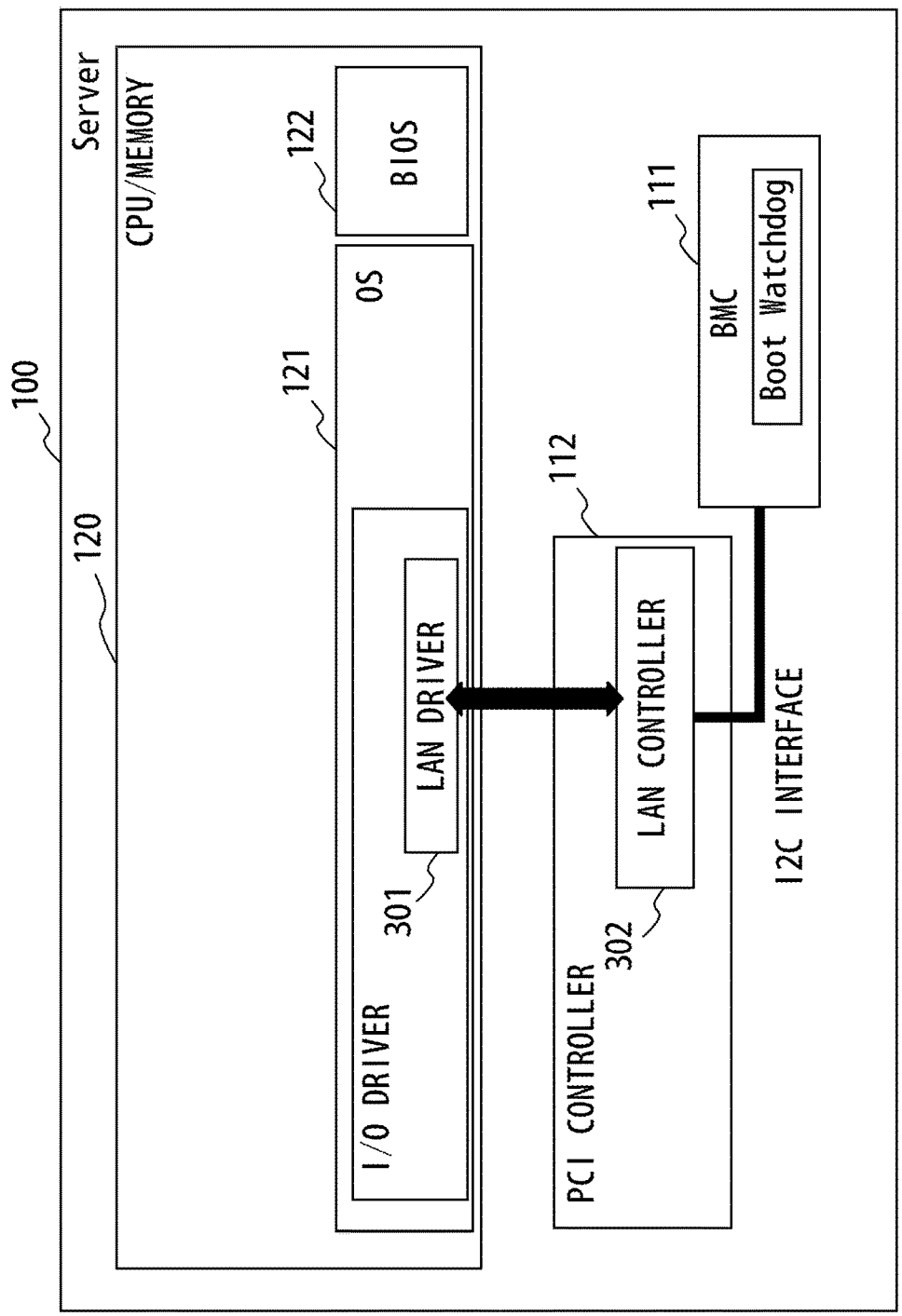
FIG. 4 is an explanatory diagram of a process of monitoring the boot-up of an OS of a server device according to a third embodiment.

FIG. 4 is an explanatory diagram of a process of monitoring the boot-up of an OS of a server device according to a third embodiment. In FIG. 4, the same components as those of FIG. 1 are denoted with the same reference numerals. The server device 100 according to the third embodiment has a LAN (Local Area Network) driver 301, which is an I/O driver. The server device 100 also has a LAN controller 302, which is a PCI controller. The LAN driver 301 notifies the LAN controller 302 of contents of an update when management information is updated while the OS is being booted. The process of monitoring the boot-up of the OS of the server device according to the third embodiment is the same as that in (1) to (9).

The BMC 111 obtains the management information from the LAN controller 302, and determines whether the OS 121 has been booted. The management information of the LAN controller 302 according to the third embodiment includes status information of a LAN driver and Link status information of a LAN. The BMC 111 determines that the OS 121 has been booted when the management information stores information indicating a status in which a LAN driver has been loaded as the status information of the LAN driver, and information indicating Linkup as the Link status information. The status information of the LAN driver is a loaded state where the BIOS has completed the initial setup of a driver, or an unloaded state where the BIOS has not completed the initial setup of the driver. The Link status information is Link up where a LAN driver recognizes that a LAN cable is connected, or Link down where the LAN driver does not recognize that the LAN cable is connected.

The management information in the third embodiment is updated when the LAN driver 301 notifies the LAN controller 302 of update information. When the BIOS has completed the initial setup of the driver, the LAN driver 301 notifies the LAN controller 302 of information indicating the loaded state as the status information of the LAN driver. In the meantime, when the server device 100 is powered down, the LAN driver 301 notifies the LAN controller 302 of information indicating the unloaded state as the status information of the LAN driver. When the LAN driver 301 recognizes that the LAN cable is connected at boot-up of an OS, it notifies the LAN controller 302 of information indicating the Link up as the Link status information. In contrast, when the server device 100 is powered down, the LAN driver 301 notifies the LAN controller 302 of information indicating the Link down where the LAN cable is not recognized. Note that the management information is not limited to the status information of the LAN driver and the Link status information of the LAN.

Figure 5:
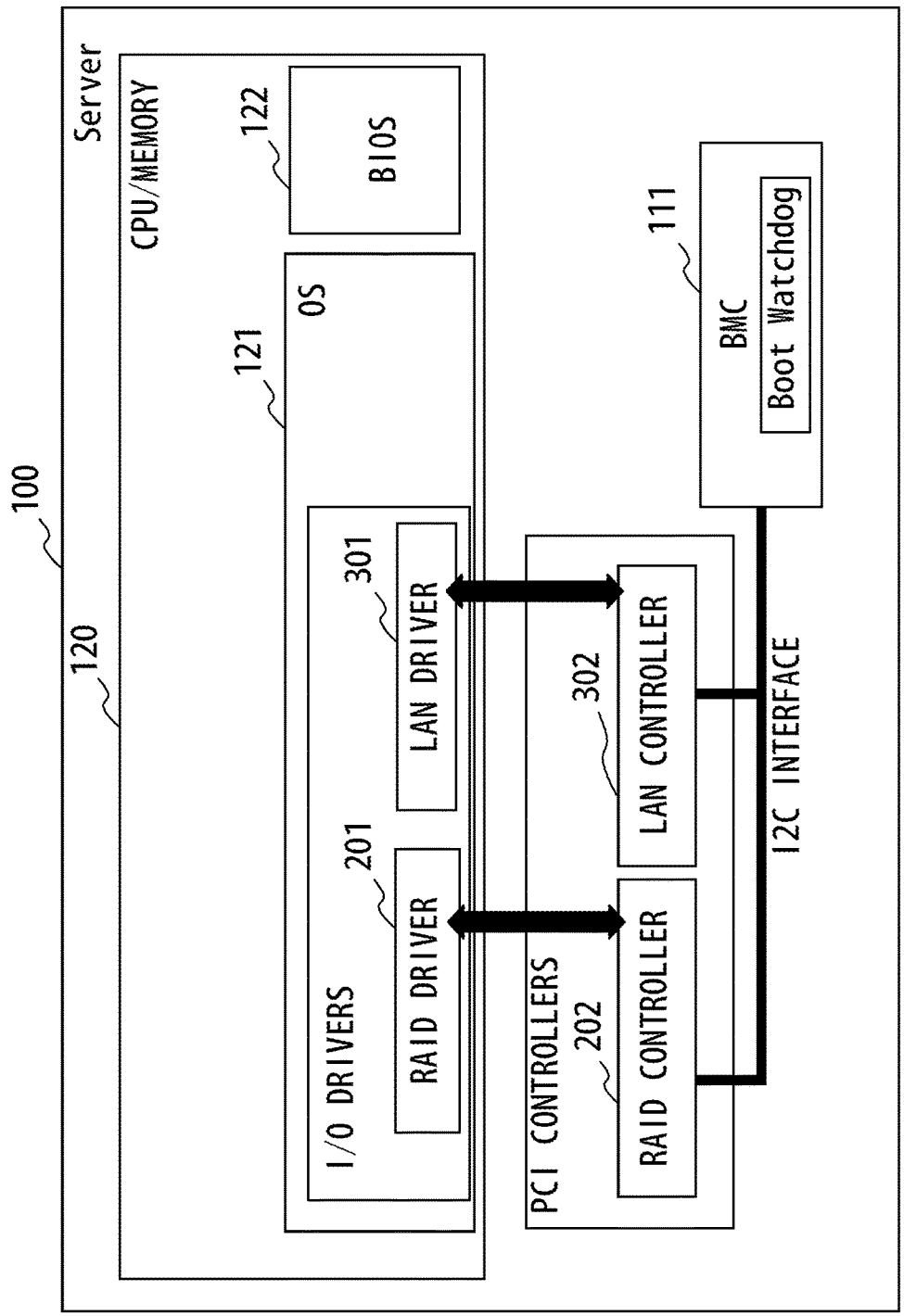
FIG. 5 is an explanatory diagram of a process of monitoring the boot-up of an OS of a server device according to a fourth embodiment.

FIG. 5 is an explanatory diagram of a process of monitoring the boot-up of an OS of a server device according to a fourth embodiment. In FIG. 5, the same components as those of FIGS. 1, 3, and 4 are denoted with the same reference numerals. The server device 100 according to the fourth embodiment has a RAID driver 201 and a LAN driver 301 as I/O drivers. The server device 100 also has a RAID controller 202 as a PCI controller corresponding to the RAID driver 201. The server device 100 has a LAN controller 302 as a PCI controller corresponding to the LAN driver 301. The process of monitoring the boot-up of the OS of the server device according to the fourth embodiment is the same as that in (1) to (9).

The BMC 111 obtains the management information from the RAID controller 202 and the LAN controller 302, and determines whether the OS 121 has been booted. The BMC 111 obtains, from the RAID controller 202, the management information including driver information, and status information of HDDs. The BMC 111 obtains, from the LAN controller 302, the management information including the status information of a LAN driver, and the Link status information of a LAN.

The BMC 111 determines that the OS 121 has been booted when the obtained management information stores the following information. Namely, in the management information, version information of a driver is stored as the driver information, information indicating that all HDDs are available is stored as the status information of the HDDs, information indicating a status in which a LAN driver has been loaded is stored as the status information of the LAN driver, and information indicating the Link up is stored as the Link status information.

FIG. 6 is a flowchart for explaining the process of monitoring the boot-up of the OS of the server device according to the first embodiment. The server device is powered up (step S101). The BMC 111 receives an instruction to invoke the BootWatchdog from the BIOS 122, and invokes the BootWatchdog (step S102). The BMC 111 determines whether a specified amount of time has elapsed after the BootWatchdog was invoked (step S103). The BMC 111 obtains, from the PCI controllers 112, management information of various types of devices equipped in the server device 100 when the specified amount of time has not elapsed ("NO" in steps S104 and S103). The BMC 111 determines whether the OS 121 has been booted (step S105). When the BMC 111 determines that the OS 121 has been booted, it stops the BootWatchdog ("YES" in steps S106 and S105). Upon termination of the process in step S106, the BMC 111 ends the process of monitoring the boot-up of the OS. When the OS 121 has not been booted, the BMC 111 repeats the process in and after S103 ("NO" in step S105). The BMC 111 executes a process such as a rebooting or a stopping of the server device when the OS has not been booted even though the specified amount of time has elapsed after the BootWatchdog was invoked ("YES" in steps S107 and S103). Upon termination of the process in step S107, the BMC 111 ends the process of monitoring the boot-up of the OS.

FIG. 7 is a flowchart for explaining the process of monitoring the boot-up of the OS of the server device according to the second embodiment. The server device is powered up (step S201). The BMC 111 receives, from the BIOS 122, an instruction to invoke the BootWatchdog, and invokes the BootWatchdog (step S202). The BMC 111 determines whether a specified amount of time has elapsed after the BootWatchdog was invoked (step S203). When the specified amount of time has not elapsed, the BMC 111 obtains, from the RAID controller 202, management information of various types of devices equipped in the server device 100 ("NO" in steps S204 and S203). The BMC 111 determines whether driver information of the management information stores version information of a driver (step S205). The BMC 111 determines whether status information of HDDs of the management information stores information indicating that all HDDs are available ("YES" in steps S206 and S205). When the determination in step S205 or S206 results in "NO", the BMC 111 repeats the process in and after S203. When the BMC 111 determines that the OS 121 has been booted, it stops the BootWatchdog ("YES" in steps S207 and S206). Upon termination of the process in step S207, the BMC 111 ends the process of monitoring the boot-up of the OS. The BMC 111 executes a process such as a rebooting or a stopping of the server device when the boot-up of the OS is not complete even though the specified amount of time has elapsed after the BootWatchdog was invoked ("YES" in steps S208 and S203). Upon termination of the process in step S208, the BMC 111 ends the process of monitoring the boot-up of the OS. Note that steps S205 and S206 may be processed in reverse order.

FIG. 8 is a flowchart for explaining the process of monitoring the boot-up of the OS of the server device according to the third embodiment. The server device is powered up (step S301). The BMC 111 receives an instruction to invoke the BootWatchdog from the BIOS 122, and invokes the BootWatchdog (step S302). The BMC 111 determines whether a specified amount of time has elapsed after the BootWatchdog was invoked (step S303). When the specified amount of time has not elapsed, the BMC 111 obtains, from the LAN controller 302, management information of various types of devices equipped in the server device 100 ("NO" in steps S304 and S303). The BMC 111 determines whether status information of a LAN driver in the management information stores information indicating a state in which a LAN driver has been loaded (step S305). The BMC 111 determines whether Link status information of the management information stores information indicating a Link up ("YES" in steps S306 and S305). When the determination in step S305 or S306 results in "NO", the BMC 111 repeats the process in and after step S303. When the BMC 111 determines that the OS 121 has been booted, it stops the BootWatchdog ("YES" in steps S307 and S306). Upon termination of the process in step S307, the BMC 111 ends the process of monitoring the boot-up of the OS. When the boot-up of the OS is not complete even though the specified amount of time has elapsed after the BootWatchdog was invoked, the BMC 111 executes a process such as a rebooting or a stopping of the server device ("YES" in steps S308 and S303). Upon termination of the process in step S308, the BMC 111 ends the process of monitoring the boot-up of the OS. Note that steps S305 and S306 may be processed in reverse order.

Figure 9:
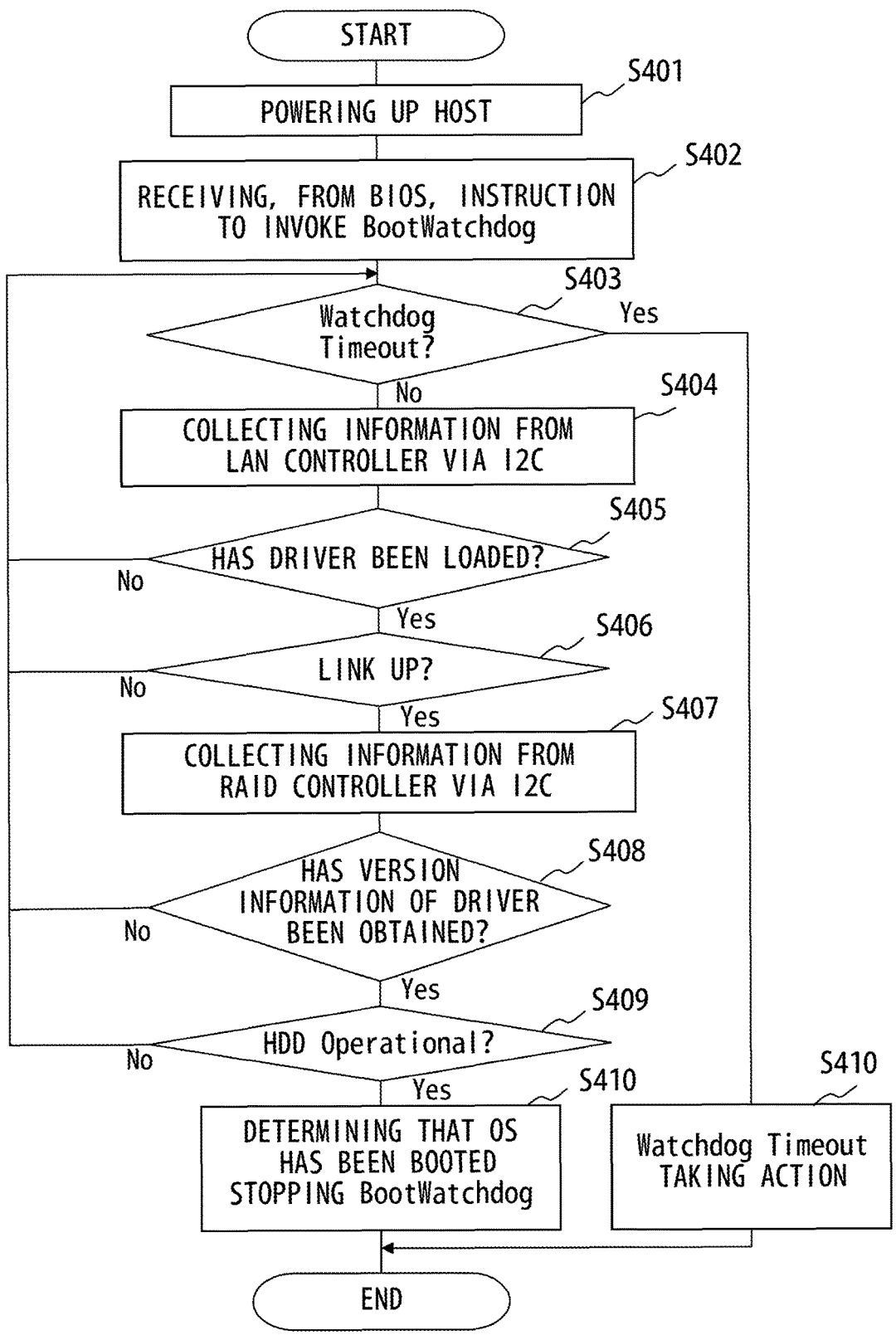
FIG. 9 is a flowchart for explaining the process of monitoring the boot-up of the OS of the server device according to the fourth embodiment.

FIG. 9 is a flowchart for explaining the process of monitoring the boot-up of the OS of the server device according to the fourth embodiment. The server device is powered up (step S401). The BMC 111 receives an instruction to invoke the BootWatchdog from the BIOS 122, and invokes the BootWatchdog (step S402). The BMC 111 determines whether a specified amount of time has elapsed after the BootWatchdog was invoked (step S403). When the specified amount of time has not elapsed, the BMC 111 obtains, from the LAN controller 302, management information of various types of devices equipped in the server device 100 ("NO" in steps S404 and S403). The BMC 111 determines whether status information of a LAN driver of the management information stores information indicating a state in which a LAN driver has been loaded (step S405). The BMC 111 determines whether Link status information of the management information stores information indicating Link up ("YES" in steps S406 and S405). When the determination in step S405 or S406 results in "NO", the BMC 111 repeats the process in and after step S403.

The BMC 111 obtains, from the RAID controller 202, the management information of the various types of devices equipped in the server device 100 ("YES" in steps S407 and S406). The BMC 111 determines whether driver information of the management information stores version information of the driver (step S408). The BMC 111 determines whether status information of HDDs of the management information stores information indicating that all HDDs are available ("YES" in steps S409 and S408). When the determination in step S408 or S409 results in "NO", the BMC 111 repeats the process in and after step S403. When the BMC 111 determines that the OS 121 has been booted, it stops the BootWatchdog ("YES" in steps S410 and S409). Upon termination of the process in step S410, the BMC 111 ends the process of monitoring the boot-up of the OS. When the boot-up of the OS is not complete even though the specified amount of time has elapsed after the BootWatchdog was invoked, the BMC 111 executes a process such as a rebooting or a stopping of the server device ("YES" in steps S411 and S403). Upon termination of the process in step S411, the BMC 111 ends the process of monitoring the boot-up of the OS. Note that steps S404 to S406 and steps S407 to S409 may be processed in reverse order. Moreover, steps S405 and S406 may be processed in reverse order. Additionally, steps S408 and S409 may be processed in reverse order.

As described above, the method according to the embodiment enables the monitoring of the boot-up of an OS without using an agent. Moreover, this method enables information to be obtained regardless of a type of an OS by obtaining the information with the use of management information of various types of devices, such as a LAN driver, a RAID driver, and the like, via an I2C interface, whereby a BMC is enabled to monitor the boot-up of an OS.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or embodiments of the present invention have been described in detail, it should be understood that the various changes, substitutions, and alterations could be made hereto without departing from the spirit and scope of the invention.

What is claimed is:

1. An information processing device, comprising:
   a processor configured to execute an OS (Operating System);
   a controller configured to control an I/O device connected to the processor, and to obtain, from the processor, management information about the I/O device;
   a monitor configured to monitor a boot-up state of the OS based on the management information obtained by the controller without using an agent; and
   the monitor stops monitoring the boot-up state of the OS when the management information stores management information of a RAID driver within the processor, and information indicating that all Disk Drives connected to the processor are available.

2. An information processing device, comprising:
   a processor configured to execute an OS (Operating System);
   a controller configured to control an I/O device connected to the processor, and to obtain, from the processor, management information about the I/O device;
   a monitor configured to monitor a boot-up state of the OS based on the management information obtained by the controller without using an agent; and
   the monitor stops monitoring of the boot-up state of the OS when the management information stores information indicating that initial setup of a LAN driver is complete in the processor, and information indicating a state in which the processor recognizes that a LAN cable is connected.

3. A non-transitory computer-readable recording medium having stored therein a monitoring program for causing a processor to execute a process, the process comprising:

obtaining management information about an I/O device connected to a processor from the processor configured to execute an OS (Operating System);
monitoring a boot-up state of the OS on the basis of the obtained management information without using an agent;
stopping monitoring of the boot-up state of the OS when the management information stores management information of a RAID driver within the processor and information indicating that all Disk Drives connected to the processor are available.

4. A non-transitory computer-readable recording medium having stored therein a monitoring program for causing a processor to execute a process, the process comprising:
obtaining management information about an I/O device connected to a processor from the processor configured to execute an OS (Operating System);
monitoring a boot-up state of the OS on the basis of the obtained management information without using an agent;
stopping monitoring of the boot-up state of the OS when the management information stores information indicating that initial setup of a LAN driver is complete in the processor, and information indicating a state in which the processor recognizes that a LAN cable is connected.

5. A monitoring method, comprising:
obtaining, by a controller, management information about an I/O device connected to a processor from the processor configured to execute an OS (Operating System);
monitoring, by a monitor, a boot-up state of the OS based on the obtained management information without using an agent; and
stopping monitoring of the boot-up state of the OS when the management information stores management information of a RAID driver within the processor and information indicating that all Disk Drives connected to the processor are available.

6. A monitoring method, comprising:
obtaining, by a controller, management information about an I/O device connected to a processor from the processor configured to execute an OS (Operating System);
monitoring, by a monitor, a boot-up state of the OS based on the obtained management information without using an agent; and
stopping monitoring of the boot-up state of the OS when the management information stores information indicating that initial setup of a LAN driver is complete in the processor, and information indicating a state in which the processor recognizes that a LAN cable is connected.

* * * * *